Dec. 10, 1935.   R. V. KLEINSCHMIDT   2,023,637
PROCESS AND APPARATUS FOR PROMOTING CHEMICAL
REACTIONS IN THE ELECTRICAL DISCHARGE
Filed July 8, 1930
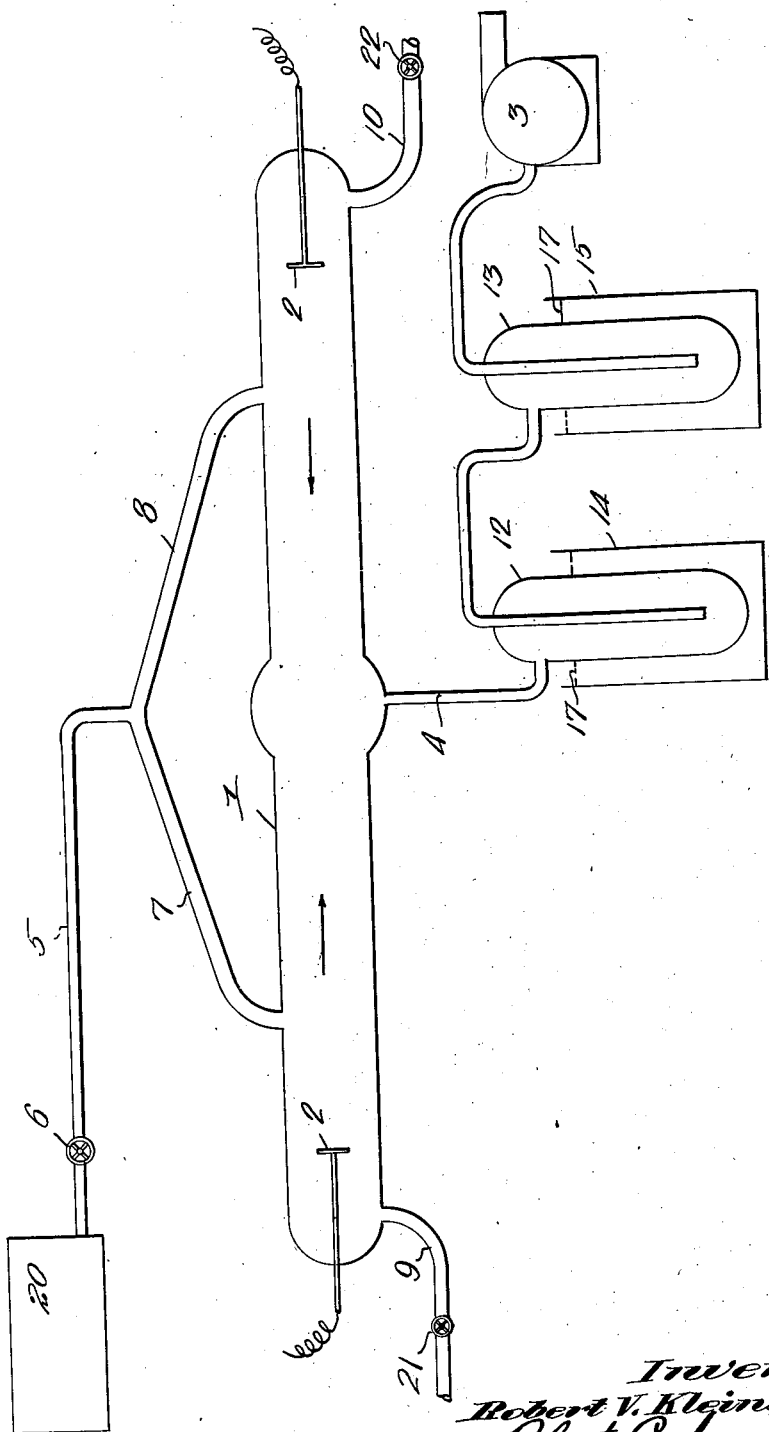
Inventor
Robert V. Kleinschmidt
by Roberts, Cushman & Woodbury
his Attorneys Patented Dec. 10, 1935

2,023,637

UNITED STATES PATENT OFFICE 2,023,637

PROCESS AND APPARATUS FOR PROMOTING CHEMICAL REACTIONS IN THE ELECTRICAL DISCHARGE

Robert V. Kleinschmidt, Arlington, Mass., assignor to Arthur D. Little, Incorporated, Cambridge, Mass., a corporation of Massachusetts Application July 8, 1930, Serial No. 466,431

18 Claims. (Cl. 204—31)

This invention relates to promoting chemical reactions by electrical activation, and provides a way of carrying on certain chemical reactions with greater facility than usual and of carrying on certain chemical reactions which will not take place ordinarily. My invention in some instances dispenses with the need for catalytic agents in carrying on chemical reactions, my improved process of electrical activation rendering a catalyst unnecessary in these cases, but my invention is not to be limited to carrying on chemical reactions without catalysts.

My invention relates particularly to that type of electrical activation wherein material is subjected to and reacts with a gas which is ionized by an electrical discharge. Here I intend to include the special case of polymerization wherein a single gas reacts with itself. When I speak of a "gas" I intend to include thereby "vapor".

I have discovered that if such electrical activation is carried out at relatively low pressures, by which I mean pressures of less than 10 millimeters of mercury, electrical activation may be carried out with results greatly improved over the results attained at higher pressures. At the low pressures employed in my process the electrical discharge to which the material is subjected may take the form of a glow discharge, which may easily be distinguished from the so-called Corona or brush discharges effected at higher pressures. Such a glow discharge, which becomes visible at pressures at or below about 5 millimeters of mercury in the case of air, spreads fairly uniformly across the entire transverse dimension of a tubular vessel in which produced and hence acts more uniformly upon all portions of the reacting materials passing therethrough than in the case of discharges of the Corona type.

By carrying out the electrical activation of the reacting substances at low pressures I am able to subject the reacting substances to electrical energy through a gaseous medium having the maximum of electrical conductivity. Thus relatively low voltages of the order of 1000 to 2000 volts in the case of alternating current, or even lower in the case of continuous current, will suffice to establish the requisite electrical discharge. Potentials of over 5000 volts are preferably to be avoided in carrying on my process. The relatively low voltages which I prefer to employ are more readily handled than higher voltages and also involve a lower input of energy to produce the necessary ionization than the necessarily higher voltages at higher pressures of the gaseous medium, and hence give greater efficiency of electrical energy employed with respect to the degree of ionization produced.

By working in the region of maximum electrical conductivity I obtain also the maximum ionization per unit of volume. This ionization of the reacting substances under the influence of the electrical discharge is apparently the immediate cause of the chemical activation. Accordingly by operating in the region of maximum ionization per unit of volume I am able to carry on the reaction at the most economical space concentration.

The advantages resulting from operating in the region of maximum electrical conductivity and consequently minimum expenditure of electrical power, are far greater than the mere saving in the cost of power. In my process as described relatively little heat is generated in the reacting gases so that it becomes commercially feasible to operate the process in certain instances at very low temperatures. The products of reactions carried out at low temperatures are in general different from those obtained at high temperatures, and only by the use of my process is it practical to activate materials in such manner as to cause reaction to take place at relatively low temperatures without the generation of so much heat (due to wasted electrical energy) that the low temperature can not practically be maintained or controlled.

The accompanying drawing shows diagrammatically and by way of example a form of apparatus suitable to carry on my process with certain materials, it being understood however that the form of the apparatus, particularly with respect to provision for conducting material to and from the reaction chamber, may be varied greatly to accommodate different materials.

Furthermore any suitable provision may be made for cooling the reaction chamber of the apparatus in case it is desired to carry on reactions at low temperatures.

Referring to the drawing, the apparatus includes a reaction chamber 1 equipped with opposed electrodes 2, 2, connected to a suitable source of electrical potential of the order of 1000 to 2000 volts. In the present instance the electrodes may be assumed to be about eight inches apart, although the distance between electrodes may be varied without a proportional change in electrical potential. It will be apparent that with the electrodes spaced approximately 8 inches apart, and with a suitable source of electrical potential of approximately 1000 volts, the average potential gradient between the electrodes will be approximately 50 volts per centimeter, which is an average potential found satisfactory for activating various materials. It is to be noted that my invention does not necessitate the maintenance of high potential gradients between the electrodes, and such average potential gradient need not exceed 250 volts per centimeter even when higher total potentials are employed.

It is a desirable feature of my invention that a considerable space is available for chemical reaction away from the surfaces of the two conducting electrodes, so that activation may be caused by the relatively lower potential gradient existing in the portion of the apparatus not influenced by the surface effect of the two electrodes, and hence not subject to the destructive action of the relatively high release of electrical energy at these two points. Means for maintaining a reduced pressure within the reaction chamber is provided, in the present instance this means comprising a vacuum pump 3 communicating through a suitable exit duct 4 with the reaction chamber. An entrance duct 5 controlled by a suitable valve 6 leads from any suitable container 20 for material, into the reaction chamber 1, in the present instance through branch entrance ducts 7 and 8. Other entrance ducts 9 and 10 controlled by valves 21 and 22 are preferably provided, and enter the reaction chamber 1 at points at which the gas admitted thereby will pass over and bathe the electrodes on its way to the exit duct 4, gas from the duct 9 thereby being adapted to exclude the reactive medium from the left electrode, and gas from the duct 10 being adapted to exclude the reactive medium from the right electrode shown in the drawing.

Suitable means is preferably provided for separating the desired reaction products from the flow of material from the reaction chamber, the specific form of such means being dependent upon the character of the product and the waste material involved. In the illustrated apparatus, separating means for separating a condensible though somewhat volatile hydrocarbon product is provided, and comprises the collection chambers 12 and 13 surrounded by outer containers 14 and 15 which hold suitable refrigerant 17.

In case one material is to be caused to react with a second material this second material, (for example oxygen) may be admitted through the entrance ducts 9 and 10, the flow thus induced passing over and around the electrodes 2, 2 and serving to keep them cool and prevent deposit of carbon thereon. Obviously inert gas (for example, nitrogen) may well be admitted through the entrance ducts 9 and 10 for this purpose. The major effect of admitting a non-decomposable gas through the ducts 9 and 10 is to bathe the electrodes with such gas and prevent the access of destructible reactive material to the vicinity of each of these electrodes. In this way it is assured that the destructible reactive material will not be subjected to the destructive action of the high potential gradient present at the surface of the electrode.

While applicable generally to promoting chemical reactions my improved process is particularly adapted for use in promoting condensation or polymerization of hydrocarbons and also in promoting oxidation of hydrocarbons.

My improved process is capable of effecting polymerization of hydrocarbons which are unsaturated or in which carbon atoms are joined by a double bond, as in the case of cyclic hydrocarbons containing benzene and analogous rings.

As an instance of the carrying on of my process to effect polymerizations ordinarily impossible at atmospheric pressure and at low temperatures, benzene may be polymerized to diphenyl and similar compounds of higher molecular weight. Some of the products thus obtained are highly resistant to boiling acid and alkalies and to all common organic solvents.

Benzene in a liquid state may be supplied from the container 20. The vacuum pump 3 is operated to provide a very low pressure in the reaction chamber, thus drawing benzene from the container 20 through ducts 5, 7 and 8 into the reaction chamber. The valve 6 is adjusted to limit the flow of benzene and to maintain the desired vacuum within the system. Upon passing the valve 6 the benzene volatilizes and enters the reaction chamber in a gaseous state. An electrical glow discharge is set up between the electrodes 2, 2 by applying the necessary electrical potential thereto. The benzene vapor passes through the reaction chamber from ducts 7 and 8 to exit duct 4, and in this passage a considerable portion thereof is polymerized to diphenyl and similar compounds of higher molecular weight. The reaction products, together with that portion of the benzene which has not polymerized, is drawn from the reaction chamber 1, through the duct 4 by the vacuum pump 3. The desired reaction products are retained within the collection chambers 12 and 13. If desired, an inert gas, for instance nitrogen, is admitted through ducts 9 and 10 to cool the electrodes and prevent deposit of carbon on the electrodes. Such inert gas is drawn out through the exit duct 4 by the vacuum pump. During the reaction the speed of the vacuum pump is maintained at such a value, and the inlet valves 6, 21 and 22 are maintained at such positions, that the pressure of the gaseous medium of the reaction chamber is maintained at less than 10 millimeters of mercury. Preferably the pressure is maintained at approximately 1 millimeter of mercury, at which value the gaseous medium has been found to have the maximum electrical conductivity. As another instance of my process, I have polymerized naphthalene to high molecular weight compounds similar to those derived from benzene.

To carry on my process to effect oxidation, an oxygen-bearing gas (by which I intend to include oxygen per se) may be drawn into the reaction chamber concomitantly with the substance to be oxidized. In general the speed of reaction is so greatly accelerated at the low pressures employed in the reaction chamber that oxygen compounds, such for example as carbon dioxide, are preferable to pure oxygen as a source of oxygen supply. As an instance of the application of my process to oxidations ordinarily impossible at atmospheric pressure, I have succeeded in directly oxidizing benzene to various phenols.

In some cases it may be desirable to operate my process with liquids or even solids that have very low vapor pressures at the temperatures at which it is desired to operate. In such cases one of the constitutents will normally be a gas which will be maintained at suitable pressure, and which will serve to carry the current and act as the primary ionized medium. The liquid constituent will then be sprayed or atomized into the gaseous material, preferably volatilizing therein before the latter is ionized. The ionized gas will then be capable of acting chemically on the initially liquid material. As exemplifying the promotion of chemical reactions with solids, it has been found possible to oxidize solid naphthalene at low temperatures, such as 0° C., by putting flaky crystals of naphthalene into the discharge tube and passing the oxygen-carrying gas, (e. g. air or carbon dioxide) through or over the surface of the crystals. In such a case, however, the temperature must be kept low and the electrical energy input must not be too great, or the naphthalene will vaporize excessively and raise the pressure above that which gives the optimum working conditions.

It will readily be apparent that various constituents may be put into the reaction chamber in different ways. However, in each instance, it is preferably to avoid subjecting to the electrical discharge a suspension of very fine particles which might be deposited on the electrodes.

Obviously in each instance of carrying on the process of chemical activation, the pressure in the reaction chamber may be adjusted to, or nearly to, the value which provides the maximum electrical conductivity and hence the maximum ionization of the gaseous reaction. This value will differ for various reacting materials, but may in each case be ascertained by adjusting the pressure in the reaction chamber until, for a given voltage, the maximum current passes between the electrodes. My experiments have shown that in the case of the polymerization of benzene or naphthalene, or oxidation of benzene or naphthalene, the pressure in the reaction chamber is most advantageously maintained at about 1 mm. of mercury.

Obviously while one advantage of my process resides in its capability of effecting reactions between substances incapable of reacting under other conditions, numerous other advantages of my invention are not limited to the use of any particular reacting substances, but are derived from the novel conditions under which the activating process is carried out.

My invention may readily be distinguished from processes of chemical activation which involve the mere establishment of an electrostatic field in the region in which the reaction is to take place. As will be apparent from the present specification, my invention provides a ready flow of current between conducting electrodes, the current being permitted to flow therebetween without passing through dielectric material, and merely being subject to the resistance of the gaseous medium in the reaction chamber, this gaseous medium preferably being maintained and the pressure in the region corresponding to its maximum electrical conductivity. In this way the maximum percentage of electrical energy available is supplied directly to the reacting material.

I claim:

1. Process of causing a cyclic aromatic hydrocarbon to react with itself which comprises subjecting the hydrocarbon in a dispersed state to an electrical glow discharge between conducting electrodes in a reaction chamber, permitting free access of current from one electrode to the other through said material while maintaining the pressure in said chamber at a value corresponding to the maximum electrical conductivity of the dispersion.

2. Process of causing a cyclic aromatic hydrocarbon to react with itself which comprises subjecting the hydrocarbon in a dispersed state to an electrical glow discharge between conducting electrodes in a reaction chamber, and permitting free access of current from one electrode to the other through said material while maintaining the pressure in said chamber at less than ten millimeters of mercury.

3. Process of causing benzene to react with itself which comprises subjecting benzene in a gaseous phase to an electrical glow discharge between conducting electrodes in a reaction chamber, permitting free access of current from one electrode to the other through said material while maintaining the pressure in said chamber at less than ten millimeters of mercury.

4. Process of causing benzene to react with itself which comprises subjecting benzene in a gaseous phase to a glow electrical discharge between conducting electrodes in a reaction chamber, permitting free access of current from one electrode to the other through said material while maintaining the pressure in said chamber at approximately three millimeters of mercury.

5. Process of causing naphthalene to react with itself which comprises subjecting naphthalene in a finely divided state to an electrical glow discharge between conducting electrodes in a reaction chamber, permitting free access of current from one electrode to the other through said material while maintaining the pressure in said chamber at less than ten millimeters of mercury.

6. Process of causing naphthalene to react with itself which comprises subjecting naphthalene in a finely divided state to a glow electrical discharge between conducting electrodes, permitting free access of current from one electrode to the other through said material while maintaining a pressure of approximately three millimeters of mercury.

7. Process of promoting chemical reaction comprising subjecting material to be reacted to an electrical glow discharge through gaseous medium, by establishing a flow of current through said medium between conducting electrodes and permitting free access of current from one conducting electrode to the other through said medium, maintaining the pressure of the said medium in the region corresponding to its maximum electrical conductivity, and excluding the reacting material from the destructive action of the electrode surfaces by maintaining about said electrodes an inert gas.

8. Process of promoting chemical reaction comprising subjecting material to be reacted to an electrical glow discharge through gaseous medium, by establishing a flow of current through said medium between conducting electrodes and permitting free access of current from one conducting electrode to the other through said medium, maintaining the pressure of the said medium in the region corresponding to its maximum electrical conductivity, and excluding the reacting material from the destructive action of the electrode surfaces by maintaining in the immediate vicinity of the electrodes a non-reactive gaseous medium not subject to destructive decomposition.

9. Process of promoting chemical reaction comprising subjecting material to be reacted to an electrical glow discharge through gaseous medium, by establishing a flow of current through said medium between conducting electrodes and permitting free access of current from one conducting electrode to the other through said medium, maintaining the pressure of the said medium below 5 millimeters of mercury, and excluding the reacting material from the destructive action of the electrode surfaces by maintaining about said electrodes an inert gas.

10. Process of promoting chemical reaction comprising subjecting material to be reacted to an electrical glow discharge through gaseous medium, by establishing a flow of current through said medium between conducting electrodes and permitting free access of current from one conducting electrode to the other through said medium, maintaining the pressure of the said medium below 5 millimeters of mercury, and excluding the reacting material from the destructive action of the electrode surfaces by maintaining in the immediate vicinity of the electrodes a non-reactive gaseous medium not subject to destructive decomposition.

11. Process of promoting chemical reaction, comprising subjecting material to be reacted to an electrical glow discharge through a gaseous medium by establishing a substantial flow of current through said medium between conducting electrodes and permitting free access of current from one conducting electrode to the other through said space, the potential gradient between said electrodes not exceeding on the average 250 volts per centimeter, maintaining said medium below 5 millimeters of mercury pressure and excluding the reacting material from the destructive action of the electrode surfaces by maintaining about the electrodes a non-reactive gaseous medium.

12. Process of promoting oxidation, comprising subjecting a mixture of a cyclic hydrocarbon and an oxygen bearing gas to an electrical glow discharge between conducting electrodes in a reaction chamber, permitting free access of current from one electrode to the other through said mixture, and maintaining the pressure in said chamber at a value corresponding to the approximate maximum electrical conductivity of said mixture.

13. Process of promoting oxidation, comprising subjecting a mixture of a cyclic hydrocarbon and an oxygen bearing gas to an electrical glow discharge between conducting electrodes in a reaction chamber, permitting free access of current from one electrode to the other through said mixture, and maintaining the pressure in said chamber at less than ten millimeters of mercury.

14. In the process of promoting chemical reaction wherein material to be reacted is subjected to an electrical glow discharge through reactive gaseous medium between conducting electrodes, and ready flow of current is permitted between said electrodes and through said reactive medium, the step of circulating about said electrodes a non-reactive gaseous medium thereby to exclude the reactive medium from the destructive action of the potential gradient present at the surface of the electrodes.

15. Apparatus for carrying on a chemical reaction in a gaseous medium, comprising a reaction vessel containing at least two conducting electrodes between which an electric current can flow freely in the form of a glow discharge through a reactive gaseous medium, means for maintaining a reduced pressure in the vessel appropriate to the maintenance of the glow discharge, and means for circulating about the electrodes a non-reactive gaseous medium for the purpose of excluding the reactive medium from the destructive action of the potential gradient present at the surface of the electrodes.

16. Process of promoting oxidation, comprising subjecting a mixture of benzene and an oxygen bearing gas to an electrical glow discharge between conducting electrodes in a reaction chamber, permitting free access of current from one electrode to the other through said mixture, and maintaining the pressure in said chamber at a value corresponding to the approximate maximum electrical conductivity of said mixture.

17. In the process of promoting chemical reaction wherein material to be reacted is subjected to an electrical glow discharge through a reactive gaseous medium between conducting electrodes and a ready flow of current is permitted between said electrodes and through said reactive medium, the step of circulating about one of the electrodes a non-reactive gaseous medium to exclude the reactive medium from the destructive action of the potential gradient present at the surface of the electrode.

18. Apparatus for carrying on a chemical reaction in a gaseous medium, comprising a reaction vessel containing at least two conducting electrodes between which an electric current can flow freely in the form of a glow discharge through a reactive gaseous medium, means for maintaining a reduced pressure in the vessel appropriate to the maintenance of the glow discharge, and means for circulating about one of the electrodes a non-reactive gaseous medium operative to exclude the reactive medium from the destructive action of the potential gradient present at the surface of the electrode.

ROBERT V. KLEINSCHMIDT.